(No Model.)
W. F. STUART.
THILL COUPLING.
No. 365,413. Patented June 28, 1887.
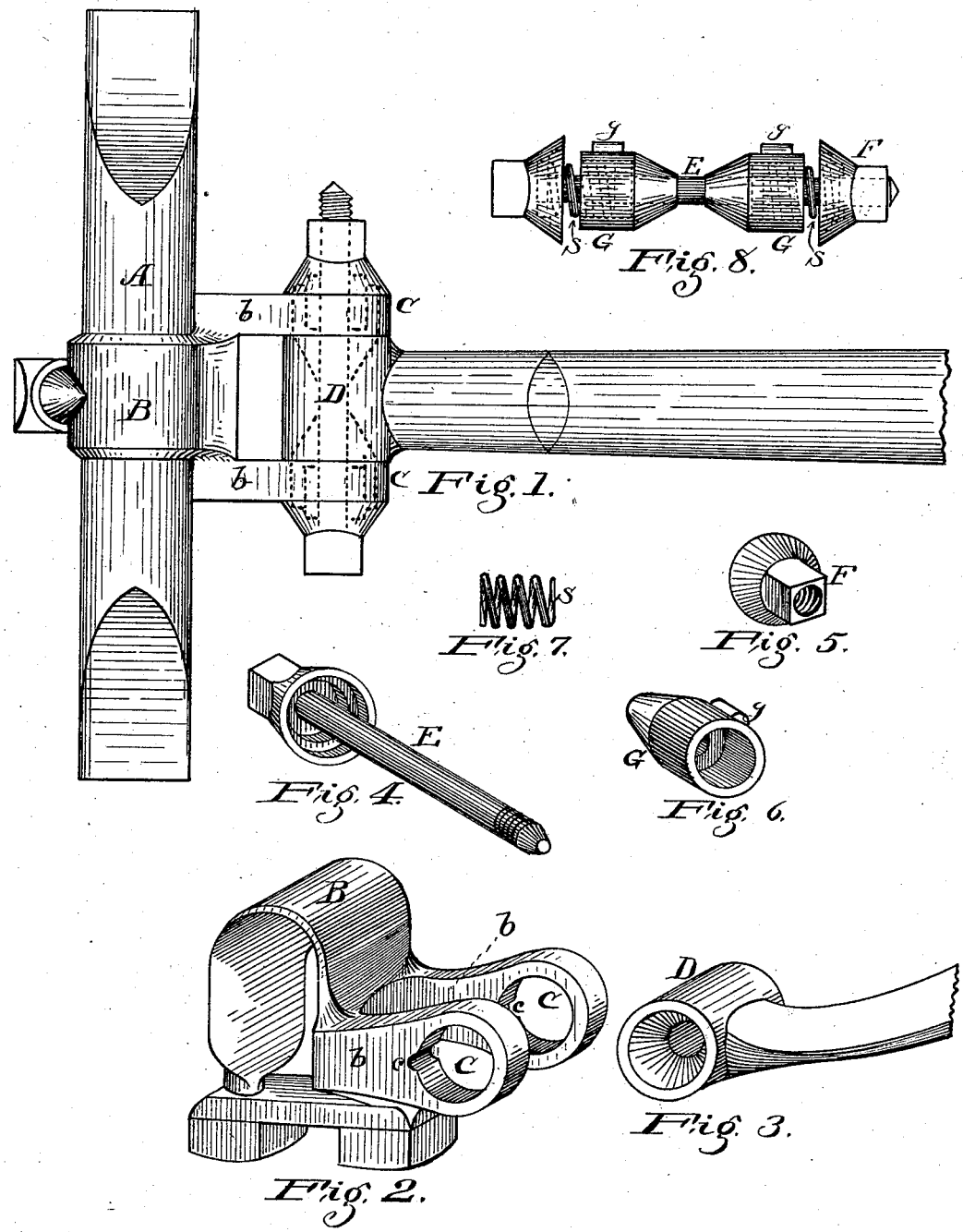
Witness,
Chas. N. Kuntz,
A. B. Allen.
Inventor,
William F. Stuart,
per Geo. W. Tibbitts, atty.

UNITED STATES PATENT OFFICE.

WILLIAM F. STUART, OF WELLINGTON, OHIO.

THILL-COUPLING.

SPECIFICATION forming part of Letters Patent No. 365,413, dated June 28, 1887.

Application filed November 29, 1886. Serial No. 220,197. (No model.)

*To all whom it may concern:*

Be it known that I, WILLIAM F. STUART, of Wellington, in the county of Lorain and State of Ohio, have invented certain new and useful Improvements in Thill-Couplers, of which the following is a specification.

This invention relates to thill-couplings; and it consists in the peculiar construction and combination, with the thill-iron and the clip-eye arms, of a bolt or pin having a chambered head, a chambered nut, chambered cone-pointed sleeves, and tension-springs, arranged to operate substantially as hereinafter described, and pointed out in the claim.

The nature and objects of my invention will fully appear from the subjoined description, when considered in connection with the accompanying drawings, in which—

Figure 1 is a top or plan view of my improved thill-coupler, the dotted lines showing the location and relation of the parts which I provide with the thill-iron. Fig. 2 is a detached view of a clip having the coupling-eyes attached. Fig. 3 is a detached view of the thill-iron. Fig. 4 is a detached view of the coupling bolt or pin, having a chambered head. Fig. 5 is a detached view of the chambered nut. Fig. 6 is a detached view of one of the chambered and conical-pointed sleeves. Fig. 7 is a detached view of one of the tension-springs; Fig. 8, a view of the coupling-bolt, the nut, the sleeves, and the springs together.

A represents part of an axle-tree.

B is a clip provided with two parallel arms, *b b*, having eyes C C.

D is a thill-iron, the eye or bore of which is made conical on each side.

E is a coupling bolt or pin, having a square head provided with a flaring flange, in which is made an annular and shouldered chamber.

F is a nut having a chambered flange like that of the bolt-head, and is intended to screw onto the threaded end of the bolt.

G is a cone-pointed sleeve having a bore the size of the bolt, and onto which it is placed in putting the parts together, the cone portion of the sleeve fitting into the conical bore of the thill-iron, with the straight portion fitting and resting in the large eyes C C of the clip, and they also have a lug or projection, *g*, which fits into a groove, *c*, in one side of the eyes C C, to prevent them from turning, the cone portion of the sleeves being the wearing-surface. The straight portion of the sleeves G is chambered for the purpose of containing the spiral springs S, which surround the bolt or pin and bear against the head of the bolt on one side of the coupling and against the nut on the other side, their tension serving to crowd the sleeves inward and hold their cone-points up into their seats in the thill-iron.

A leather washer coated with plumbago, covering the cones, will serve to lubricate bearings and prevent rapid wearing of wearing-surfaces.

From the foregoing it will be seen that the only wearing-surface is upon the cones, that the sides of the thill-iron are held from wearing against the clip-eyes by the pressure of the springs against the sleeves, and whatever wear on the cones there may take place is taken up by the pressure of the springs, and that no loose joint can accrue, nor any rattling.

Having now described my invention, I claim—

The combination, with the clip having eye-arms and the thill-iron having double cone-shaped bore, of a bolt or pin having a chambered head, a chambered nut, the chambered and cone-pointed sleeves, and the springs, constructed and arranged to operate substantially as described.

WILLIAM F. STUART.

Witnesses:
 GEO. W. TIBBITTS,
 E. W. LAIRD.